United States Patent [19]

Vinokur

[11] Patent Number: 4,461,245
[45] Date of Patent: Jul. 24, 1984

[54] FLUID INJECTION SYSTEM FOR INTERNAL COMBUSTION ENGINE

[76] Inventor: Michael Vinokur, 5 Fisherville Rd., No. 509, Willowdale, Ontario, Canada, M2R 3B6

[21] Appl. No.: 368,030

[22] Filed: Apr. 13, 1982

[51] Int. Cl.³ ............................................ F02M 25/02
[52] U.S. Cl. ............................. 123/25 L; 123/25 A; 123/25 J; 123/25 K
[58] Field of Search .................. 123/25 L, 25 J, 25 R, 123/25 A, 198 A, 25 K

[56] References Cited

U.S. PATENT DOCUMENTS

| | | | |
|---|---|---|---|
| 1,981,891 | 11/1934 | Woermann | 123/25 B |
| 2,445,337 | 7/1948 | Robinson | 123/25 J |
| 2,570,394 | 10/1951 | Schultz | 123/25 B |
| 2,606,537 | 8/1952 | Baumheckel | 123/25 L |
| 2,611,345 | 9/1952 | Sudmeier | 123/25 L |
| 2,687,120 | 8/1954 | Malec | 123/25 L |
| 2,756,729 | 7/1956 | Wolcott | 123/25 L |
| 3,196,606 | 7/1965 | Cholvin | 123/25 J |
| 3,227,314 | 1/1966 | Porter | 222/61 |
| 3,631,843 | 1/1972 | Yeiser | 123/198 A |
| 3,816,034 | 6/1974 | Rosenquest | 417/395 |
| 3,845,745 | 11/1974 | Dunlap et al. | 123/25 L |
| 3,865,907 | 2/1975 | Rock | 123/25 L |
| 3,911,871 | 10/1975 | Williams et al. | 123/25 L |
| 3,987,774 | 10/1976 | Waag | 123/25 J |
| 4,059,078 | 11/1977 | de la Rosa | 123/25 K |
| 4,063,536 | 12/1977 | Sanda et al. | 123/25 L |
| 4,188,928 | 2/1980 | Faustinos | 123/25 K |
| 4,240,380 | 12/1980 | Slagle | 123/25 L |

FOREIGN PATENT DOCUMENTS

| | | |
|---|---|---|
| 835818 | 4/1952 | Fed. Rep. of Germany . |
| 1138637 | 10/1962 | Fed. Rep. of Germany . |
| 2007763 | 11/1978 | United Kingdom . |
| 2041075 | 1/1980 | United Kingdom . |

*Primary Examiner*—Ira S. Lazarus
*Attorney, Agent, or Firm*—Burgess, Ryan & Wayne

[57] ABSTRACT

A novel pump suitable for use in a water injection system of an internal combustion engine is described. The pump controls the rate of flow of water injected into the engine. The pump includes a variable pressure inducing means for pressurizing the water contained in the pump. The variable pressure inducing means is responsive to negative back pressure developed in the intake manifold of the engine and varies the pressure of the water in accordance with changes in the negative back pressure of the manifold. As the negative back pressure decreases, the pressure of the water increases which in turn increases the flow rate of fluid from the pump into the engine. There is also disclosed a pressure sensitive nozzle for controlling the flow of fluid exiting from the nozzle as a function of fluid pressure. The nozzle includes an auxiliary fluid flow path through the nozzle that has an inlet opening of variable size. The nozzle further includes a pressure sensitive piston that provides a primary fluid flow path through the nozzle. The pressure sensitive piston normally blocks the inlet of the auxiliary flow path. In response to a pressure build up above the predetermined value in the primary fluid flow path of the piston, the piston moves thereby increasing the size of the inlet of the auxiliary flow path as the pressure build up in the primary flow path increases above the predetermined value.

16 Claims, 6 Drawing Figures

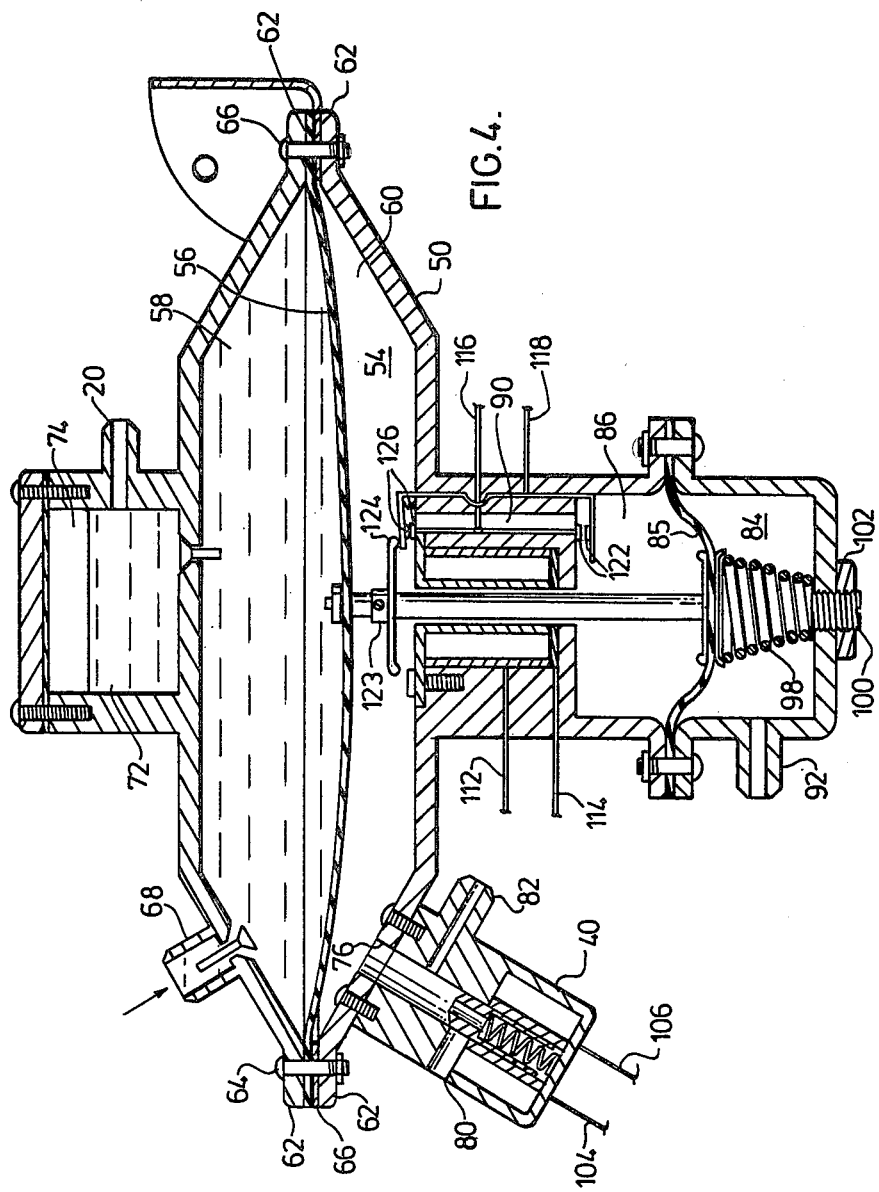

FLUID INJECTION SYSTEM FOR INTERNAL COMBUSTION ENGINE

The present invention relates to a water injection system for injecting water into the intake of an internal combustion engine. In particular the present invention relates to a pump which is responsive to changes in a negative back pressure of the manifold and to a nozzle having a regulated orifice for controlling the amount of fluid injected into the engine.

It has long been established that injection of water into the mixture of fuel and air in an internal combustion engine is advantageous. One advantage is the octane requirements of the fuel used in the engine may be reduced. Another advantage is that the water reduces the working temperature in a combustion chamber and cooling system of the engine. A further advantage is a reduction of pollutants in the byproducts of combustion.

One water injection system presently on the market utilizes an electronic controller which switches on the pump to inject a fine spray of water into the carburetor airstream. The amount of water injected into the engine is controlled by the engine speed and the intake manifold negative back pressure. The electronic controller senses the engine speed and the negative back pressure and starts the operation of the pump when the engine reaches a predetermined speed and the negative back pressure reaches a predetermined amount. The control box changes water flow through the engine as the engine increases or decreases in speed.

While the above system provides for controlled injection of water into the carburetor, the control is an electronic control. Further, the system does not provide a standard spray nozzle that may be readily used with engines of varying size.

Another type of water injection system is disclosed in U.S. Pat. No. 2,756,729 issued July 31, 1956, to H. D. Wolcott. In this patent, a valve device is provided to regulate the flow of water into the engine as a function of negative back pressure. The device includes two diaphragms each defining two sub-compartments. One of the two sub-compartments defined by each of the diaphragms is connected in continuous air flow communication with the engine manifold. The first diaphragm controls the amount of water flowing through the device by controlling the opening of two valves. As the negative back pressure decreases the first diaphragm opens the two valves in sequence. The second diaphragm carries a valve and closes the valve when the engine is stopped thereby preventing water from siphoning into the engine. This system however is expensive to manufacture and works on the principle of water draining from a reservoir through the device and into the manifold by siphonic action.

It is therefore an object of the present invention to provide a pump that is adapted for use in a fluid injection system of an internal combustion engine which pump is responsive to changes in the negative back pressure in the engine manifold to regulate the rate of flow of fluid into the engine.

It is another object of the present invention to provide a spray nozzle having a regulated orifice responsive to changes in pressure build up within the nozzle.

In accordance with one aspect of the present invention there is provided a novel pump that is adapted for use with a fluid injection system of an internal combustion engine having an intake manifold. The pump controls the rate of flow of fluid injected into the engine and comprises a variable pressure inducing means for pressurizing the fluid contained in the pump. The variable pressure inducing means is responsive to changes in the negative back pressure in the manifold to vary the pressure of the fluid. The variable pressure inducing means increases the fluid pressure as the negative back pressure decreases. As a result, the flow rate of fluid from the pump into the engine increases.

The variable pressure means may include a first diaphragm that divides a main chamber of the pump into two main sub-compartments. One of the main sub-compartments contains the fluid to be pressurized. The variable pressure inducing means may further include an actuating member for moving the diaphragm into an out of pressure inducing relation with the fluid.

The pump may further include an auxiliary chamber into which the actuating member extends. The actuating member may be connected to a second diaphragm positioned within the auxiliary chamber so as to divide the auxiliary chamber into two auxiliary sub-compartments. One of the two auxiliary sub-compartments would be in air flow communication with the manifold such that the second diaphragm would vary its position, and the position of the actuating member, as the negative back pressure varies.

The advantage of the pump of the present invention resides in the variable pressure including means being responsive to changes in the negative back pressure developed in the manifold. As a result an appropriate amount of fluid may be injected into the carburetor of the engine during changes in the operating conditions of the engine.

In accordance with another aspect of the present invention there is provided a pressure sensitive nozzle having a regulated orifice for controlling the flow of fluid exiting therefrom as a function of fluid pressure. The nozzle includes an auxiliary fluid flow path extending through the nozzle. The auxiliary fluid flow path has an inlet opening of variable size. The nozzle further includes a pressure sensitive means providing a primary fluid flow path through the nozzle. The pressure sensitive means normally blocks the inlet of the auxiliary flow path but is movable in response to a pressure build up of a predetermined value in the primary fluid flow path. The pressure sensitive means moves in such a fashion to increase the size of the inlet of the auxiliary flow path as the pressure build up in the primary flow path increases above a predetermined value. As a result of the pressure sensitive means moving in response to a pressure build up a bigger channel is provided to allow more fluid to pass through the nozzle.

For a better understanding of the nature and objects of the present invention reference may be had by way of example to the accompanying diagrammatic drawings in which:

FIGS. 2, 3 and 4 are cross-sectional views of the pump of the present invention.

Figure 1:
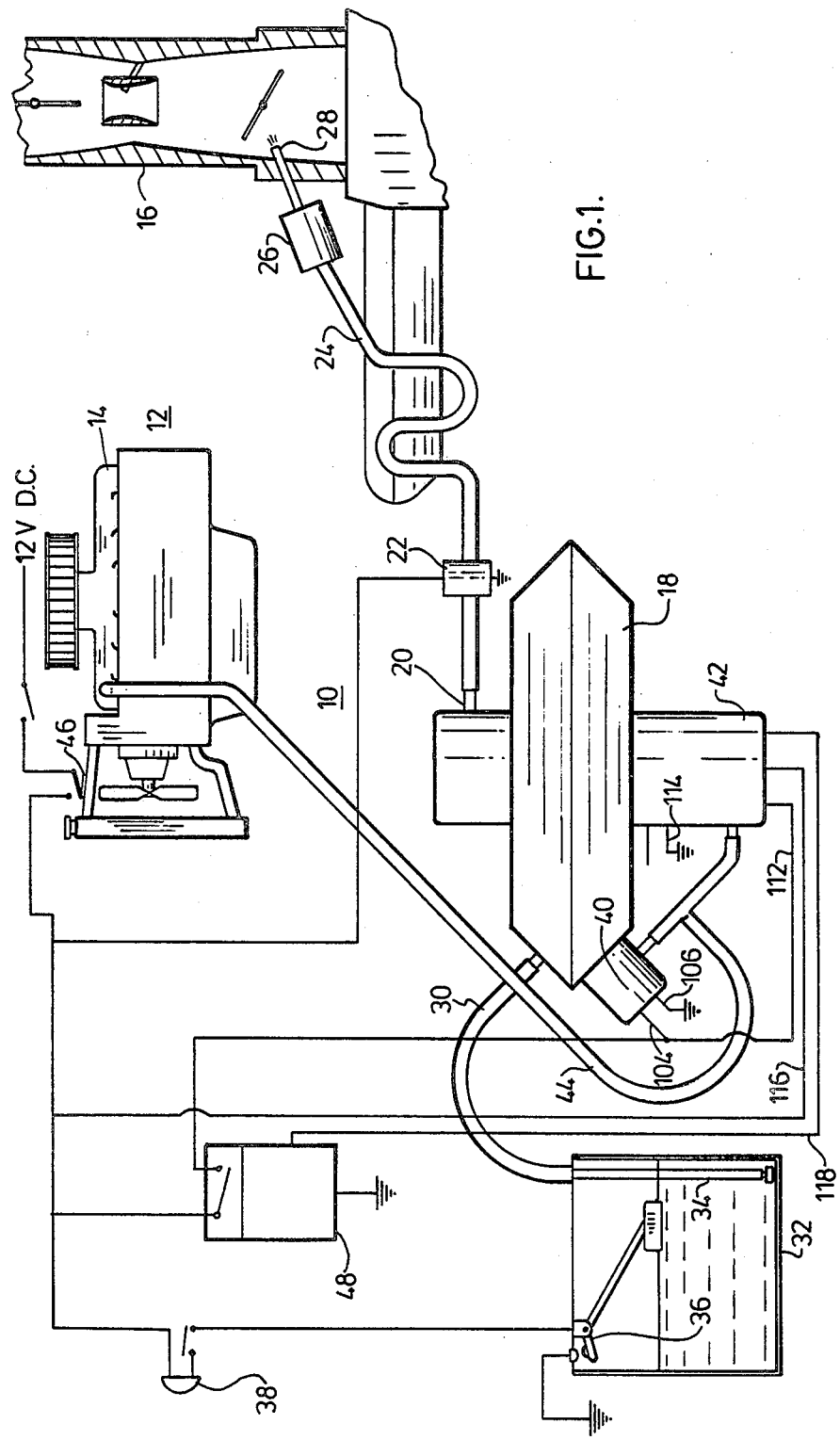
FIG. 1 is a schematic representation of a water injection system for an internal combustion engine.

Referring to FIG. 1, there is illustrated a water injection system 10 adapted for use with an internal combustion engine 12. The engine 12 includes an air intake manifold 14. The engine 12 further includes a carburetor 16 schematically illustrated to the far right of FIG. 1.

The water injection system 10 comprises a pump 18 shown in the central lower portion of FIG. 10. Pump 18 has an outlet 20 from which fluid flows when check valve 22 is open. Fluid passing through check valve 22 travels through piping 24 into spray nozzle 26. Spray nozzle 26 emits from its regulated output 28 a stream of water into the carburetor 16 of engine 12. Water enters the upper portion of pump 18 via piping 30. Piping 30 provides a fluid flow path between the pump 18 and water reservoir 32. The end of pipe 30 extending into the water reservoir 32 includes a filter 34. Water reservoir 32 is provided with an electrical float 36. When the water in reservoir 32 is low, the electric float 36 provides an electrical path through its contacts which allows light 38 to turn on. The lower portion of pump 18 has a relief air valve 40 and an auxiliary chamber 42 connected in air flow communication with manifold 14 via air hose 44.

During the operation of the engine 12, the temperature of the engine rises above a predetermined temperature value. When the engine temperature rises above this predetermined temperature value, thermal relay 46 closes. Prior to relay 46 closing a check valve 22 is closed thereby preventing the injection of water into the carburetor 16. Once the thermal relay 46 closes, the electrical circuitry of the water injection system 10 becomes operable. In this regard energy through bistable switch 48 is provided.

Figure 2:
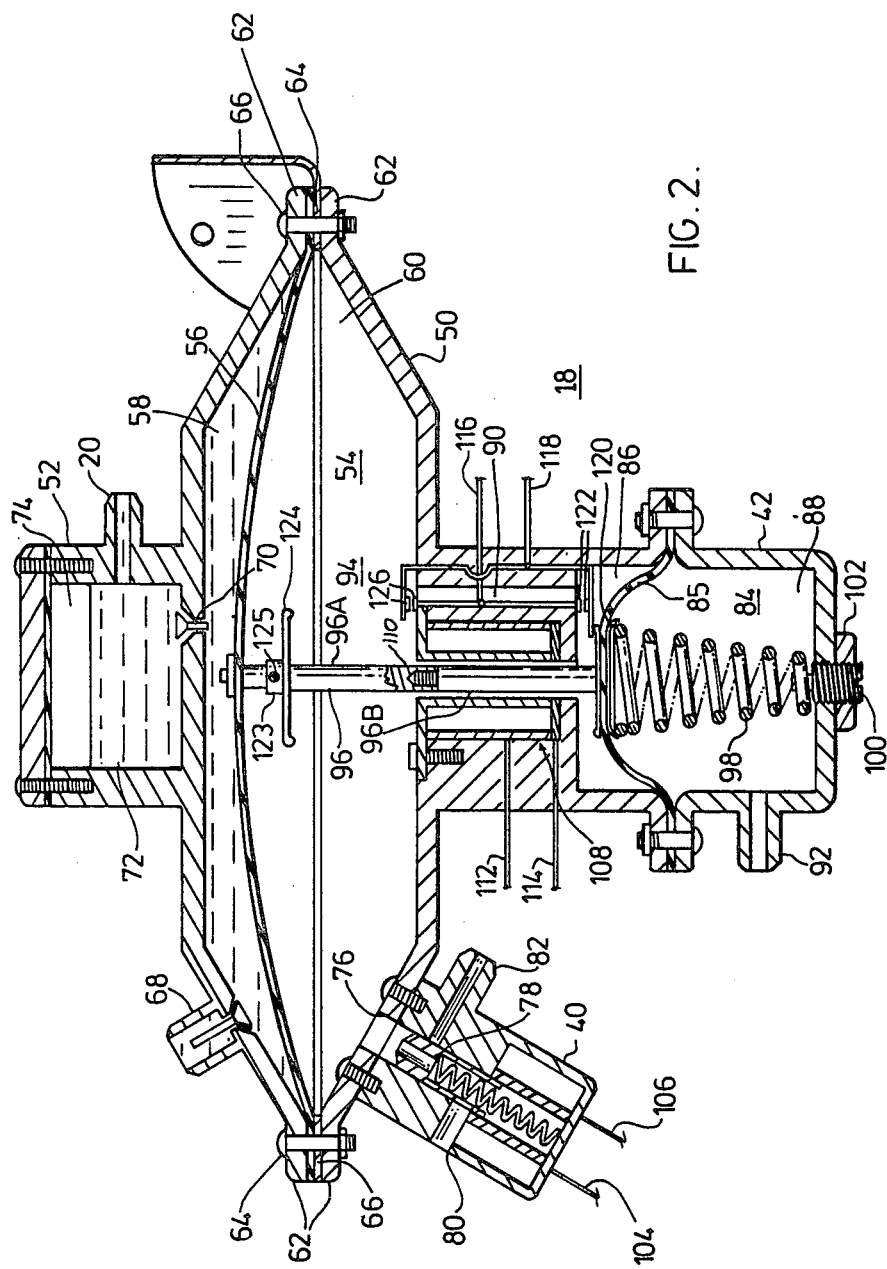
Figure 3:
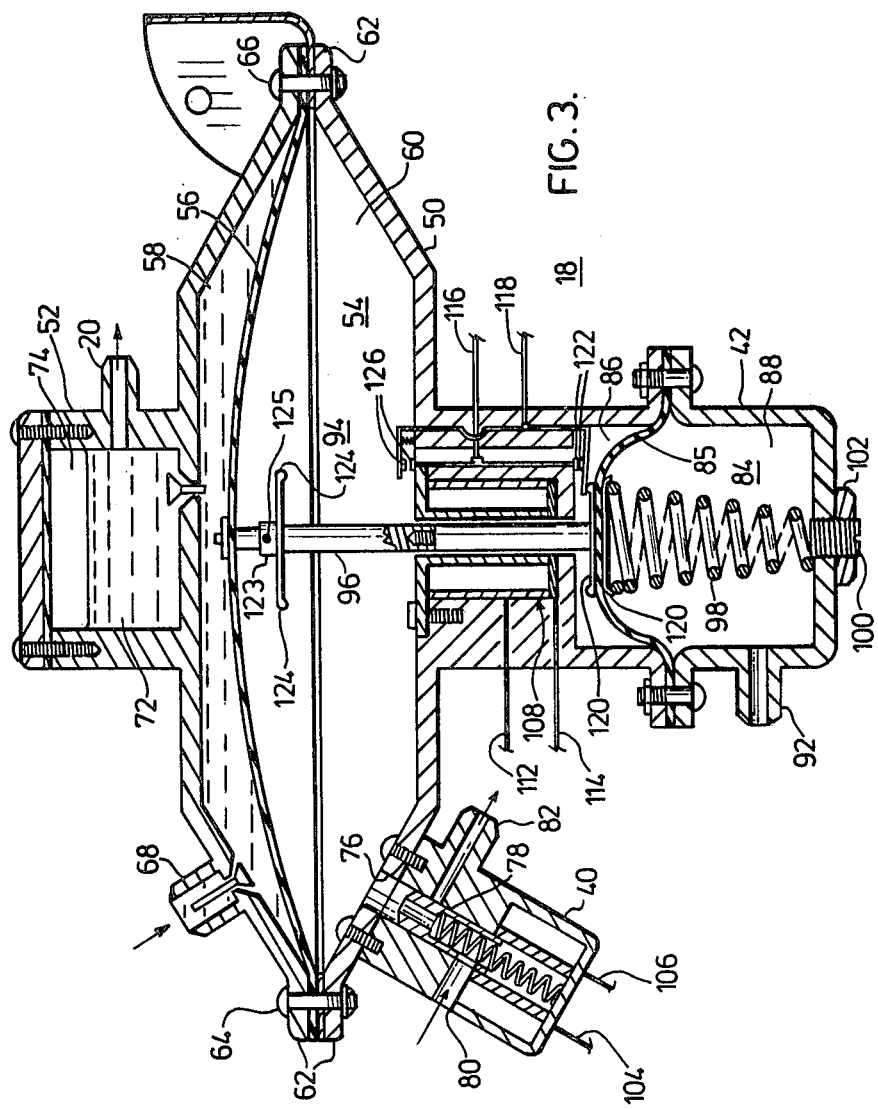

Prior to describing the operation of the water injection system 10, a detailed description of pump 18 is in order. Referring to FIGS. 2, 3 and 4 in addition to FIG. 1, the pump is shown to basically comprise four housings. The first housing is the main housing 50 having attached thereto an auxiliary housing 42 and a housing for air relief valve means 40. The last housing is pressure maintaining housing 52 shown attached to the top of housing 50.

The main housing 50 provides a main chamber 54. The diaphragm 56 positioned within chamber 54 divides the chamber into two sub-compartments 58 and 60. Diaphragm 56 is held in place between flanges 62 and washer 64 by means of screws and bolts 66. Fluid in the sub-compartment 58 will comprise water while the fluid in sub-compartment 60 is air. Water enters sub-chamber 58 through inlet boss 68 which is illustrated as a one-way valve. Inlet 68 is connected to piping 30. Water exits the sub-compartment 58 through one-way valve 70 and enters the pressure maintaining housing 52. Pressure maintaining housing 52 is provided with pump outlet 20. As illustrated, the pressure maintaining housing 52 is provided with a holding chamber 72. A portion of the holding chamber 72 comprises water while the upper portion of holding chamber 72 includes air 74. The lower sub-compartment 60 of the main chamber 54 is provided with an inlet 76. Depending on the position of valve 78 of air relief valve 40, inlet 76 is either in air flow communication with air port 80 or air port 82. The air port 80 is connected to the atmosphere and allows air under atmospheric pressure to enter sub-compartment 60. When port 82 is in air flow communication with inlet 76, the pressure within the sub-compartment 60 drops. This is because sub-compartment 60 will be in air flow communication with the manifold 14 and the negative back pressure developed in manifold 14. The auxiliary housing 42 of pump 18 includes an auxiliary chamber 84 subdivided by diaphragm 85 into auxiliary sub-compartments 86 and 88. Diaphragm 85 is secured to the auxiliary housing 42 in much the same manner as diaphragm 56 is secured to the main housing 50. Auxiliary sub-compartment 86 is in air flow communication with main sub-compartment 60 because of the air passageway 90 extending between these sub-compartments. The sub-compartment 88 is provided with a port 92 which is connected to air hose 44. Thus sub-compartment 88 is in continuous air flow communication with the negative back pressure developed in the manifold 14 of engine 12.

Pump 18 further includes a pressure inducing means generally illustrated at 94 that pressurizes the fluid contained with sub-compartment 58. The pressure inducing means 94 comprises diaphragm 56, actuating member or connecting rod 96, and spring means 98 attached to stud 100 and adjustable from the outside of the pump by adjustment means or nut 102. Nut 102 and stud 100 are adjusted such that spring 98 provides via connecting rod 96 and diaphragm 56 pressure on the fluid contained within sub-compartment 58. As illustrated, diaphragm 85 is interconnected with the rod 96 and spring 98. As a result when the pressure inducing means 94 holds diaphragm 56 in pressure inducing relation with the fluid in sub-compartment 58, the air in sub-compartment 60 and sub-compartment 86 is at atmospheric pressure and the air in sub-compartment 88 will be less than atmospheric pressure due to the negative back pressure induced in the manifold. As the negative back pressure in the manifold varies, diaphragm 85 affects the positioning of spring 98 and connecting rod 96. Accordingly the diaphragm 56 will move. Thus, as the negative back pressure in manifold 14 changes, it has an effect on the atmospheric pressure within sub-compartment 88 which causes the pressure inducing means 94 to adjust the amount of pressure induced on fluid contained within sub-compartment 58.

As shown in FIGS. 1 through 4 the air relief valve 40 is connected electrically with switch 48 via conductors 104 and 106. Also, the auxiliary housing 42 includes a magnetizing means or solenoid coil shown generally at 108. Solenoid coil 108 when energized has an effect on connecting rod 96. Connecting rod 96 comprises a non-magnetic portion 96B and a magnetic portion 96A threaded together as shown at 110. The electrical connections of solenoid 108 are interconnected with switch means 48 via electrical lines 112 and 114. Lines 116 and 118 interconnect the D.C. voltange bus with the switch control means 48 on line 118.

The operation of pump 18 with respect to the water injection system is briefly described. During normal operation, the valve operates substantially as shown in FIG. 2. That is to say diaphragm 56 pressurizes the fluid in sub-compartment 58 due to the force of spring 98 minus any forces due to the effect of the negative back pressure in manifold 14. As the negative back pressure in manifold 14 varies, diaphragm 85 adjusts the position of diaphragm 56 via connecting rod 96, thereby varying the pressure of the fluid contained in sub-compartment 58. Pressurization of fluid in sub-compartment 58 results in the fluid moving into chamber 72 and out through outlet port 20 to the carburetor 16 of engine 14. As the amount of fluid in sub-compartment 58 decreases, the variable pressure inducing means 94 moves into the position substantially as shown in FIG. 3. In this position a lower push bar 120 causes contacts 122 to close. This activates switching means 48 which in turn energizes the air valve 40 and vacuum assist solenoid 108.

Energization of air relief valve 40 causes valve 78 to move into the position substantially as shown in FIG. 4. This results in the atmospheric pressure of air contained within sub-compartment 60 and sub-compartment 86 to drop to that of the negative back pressure in the manifold 14. The negative back pressure within sub-compartment 60 tends to draw diaphragm 56 downward thereby drawing additional fluid from the water reservoir 32 via piping 30 and in through inlet port 68 into sub-compartment 58. To assist in moving diaphragm 56 downward into pressure drawing relation, the solenoid 108 is energized and pulls the magnetic portion 96B of connecting rod 96 downwardly. The connecting rod 96 is pulled downwardly until such time as the actuating or pusher bar 124 brings contacts 126 into contact as shown in FIG. 4. As illustrated, pusher bar 124 is provided with a sleeve 123 that surrounds connecting rod 96. Also, pusher bar 124 has an adjusting screw 125 that allows the location of pusher bar 124 on the rod 96 to be changed. Thus, the location of the pusher bar 124 can be changed to vary the length of time of the water intake cycle. Fluid continues to leave the pump 18 via inlet 20 during the water intake cycle of the pump because of one-way valve 70 closing and because water in chamber 72 is under pressure due to the air pocket 74. When the contacts 126 are closed as shown in FIG. 4, the switch means 48 de-activates the valve 78 in relief air valve 40 so that the valve 78 moves back into the position shown substantially as in FIG. 2. This will bring the air pressure in the sub-compartment 60 and 86 back up to atmospheric pressure. Also, when contacts 126 are closed, switch means 48 de-activates solenoid 108. Diaphragm 56 is once again free to move into pressure inducing relation with the fluid contained in sub-compartment 58.

Figure 6:
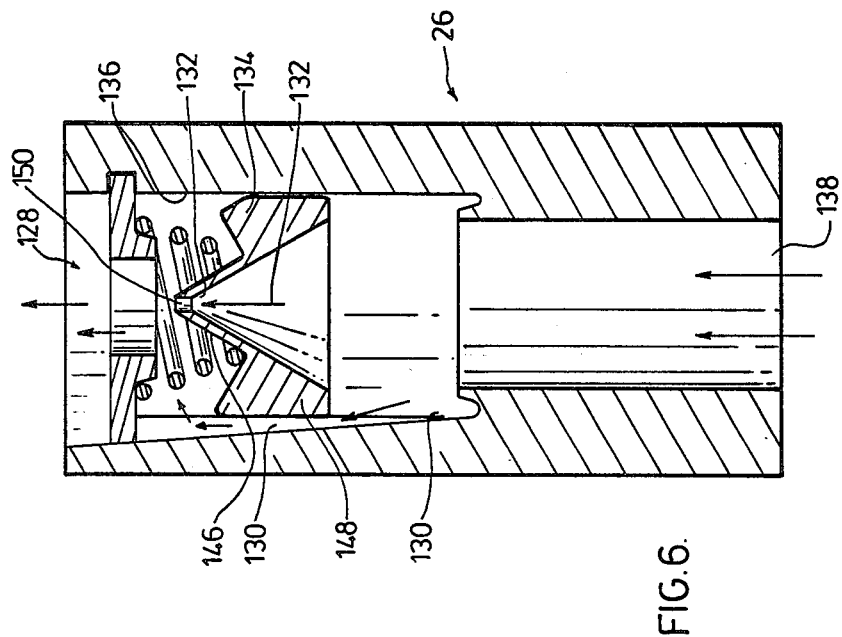
FIGS. 5 and 6 are cross-sectional views of the nozzle of the present invention.
Figure 5:
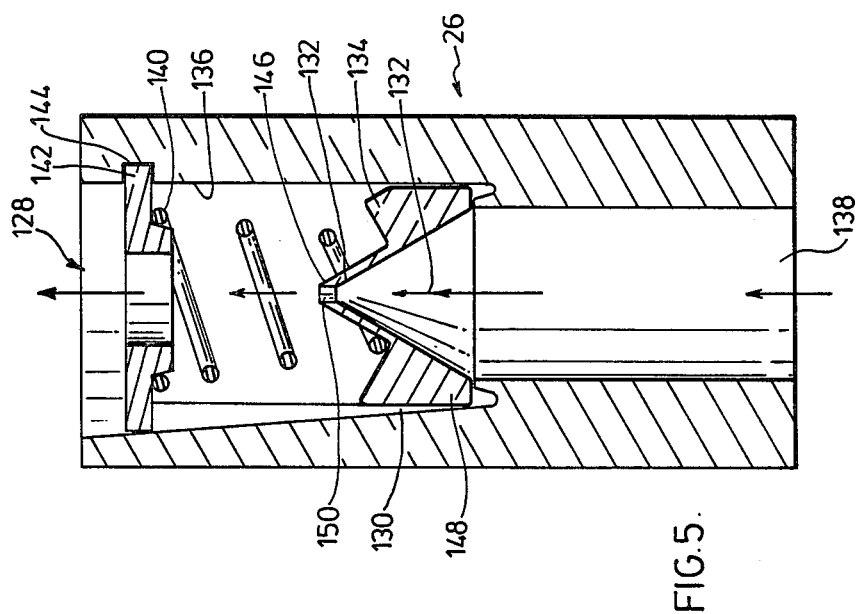

Referring to FIGS. 5 and 6 the pressure sensitive nozzle 26 having the regulated orifice is described. The nozzle includes an auxiliary air flow path shown by arrows 130 and a primary air flow path shown by arrows 132. The nozzle includes a pressure sensitive means or piston 134 movable within cylinder 136. The auxiliary air flow path 130 is provided by cutting a notch out of the interior wall of cylinder 136. The auxiliary air flow channel 130 increases in size as it extends away from the inlet 138 of nozzle 26 towards the regulated orifice 128. A spring means in the form of coiled spring 140 is mounted to a spring lock 142 positioned in the groove 144 of the nozzle 26. The other end of spring 140 surrounds the nose 146 of piston 134. When the pressure build up within the conical interior wall of piston 134 is below a predetermined amount, the spring 140 pushes the piston 134 into the position substantially as shown in FIG. 5. In this position, portion 148 of piston 134 blocks off the inlet of auxiliary flow path 130. As a result all fluid entering the inlet 138 of nozzle 26 passes through orifice 150 in the nose 146 of piston 134. As the pressure in the conical piston 134 builds up above a predetermined value, piston 134 moves towards the spring lock 142 and against spring 140. As a result an inlet is provided for the auxiliary fluid flow path 130. This latter position of the piston 134 is shown in FIG. 6. Because auxiliary fluid flow path 130 has an opening cross-section area that increases in size as the piston 134 moves towards the spring lock 142, the amount of fluid streaming out of nozzle 26 varies as the pressure of this fluid varies. It should be understood that because the piston 134 moves in response to a pressure build up within its conical walls, as the size of the inlet for auxiliary fluid path 130 increases, the buildup of fluid pressure within the cone of piston 134. Thus the position of the piston 134 stabilizes when the fluid pressure stabilizes.

In an alternative embodiment of the invention, the magnetizing means or solenoid 108 is used to maintain the diaphragm 56 of the pressure inducing means 94 in pressure inducing relation with the water contained in main sub-compartment 58. In this embodiment, the electrical conductors 116, 118 of solenoid 108 would be connected to an electronic control circuit. The electronic control circuit would vary the energization of solenoid 108 as a function of change in the RPM of the engine. This would cause the pressure inducing means to vary the pressure of the water contained in sub-compartment 58. Of course the polarity of the connecting rod 96 would be changed. While this embodiment could be used during the normal operation of the engine, it preferably would be used for engines that have a lower negative back pressure developed in the intake manifold when operating at high RPM than at idling RPMs.

The embodiments of the invention in which an exclusive property or privilege is claimed are defined as follows:

1. A pump adapted for use in a fluid injection system of an internal combustion engine having an intake manifold, said pump controlling the rate of flow of fluid injected into said engine and comprising:

variable pressure inducing means for pressurizing the fluid contained within the pump, said variable pressure inducing means including a first diaphragm dividing a main chamber of said pump into two main sub-compartments, one of said main sub-compartments containing the fluid to be pressurized, and an actuating member for moving said diaphragm into and out of pressure inducing relation with said fluid; and, an auxiliary chamber into which said actuating member extends, said actuating member being connected to a second diaphragm in said auxiliary chamber, said second diaphragm dividing said auxiliary chamber into two auxiliary sub-compartments being in continuous air flow communication with said manifold;

whereby said variable pressure inducing means is responsive to changes in negative back pressure in said manifold to vary the pressure of said fluid such that as said negative back pressure decreases the pressure of said fluid increases thereby increasing the flow rate of fluid from said pump to said engine.

2. The pump of claim 1 wherein said actuating member is further connected to a spring means biasing said actuating member and said first diaphragm into said pressure inducing relation, said spring means located within said one auxiliary sub-compartment.

3. The pump of claim 2 wherein said spring means is positionable within said pump by adjustment means acessible from outside said pump for adjusting the force exerted by said spring.

4. A pump adapted for use in a fluid injection system of an internal combustion engine having an intake manifold, said pump controlling the rate of flow of fluid injected into said engine and comprising:

variable pressure inducing means for pressurizing the fluid contained within the pump, said variable pressure inducing means including a first diaphragm dividing a main chamber of said pump into two main sub-compartments, one of said main sub-compartments containing the fluid to be pressurized, and an actuating member for moving said diaphragm into and out of pressure inducing relation with said fluid; said variable pressure inducing means being responsive to changes in negative back pressure in said manifold to vary the pressure of said fluid such that as said negative back pressure decreases the pressure of said fluid increases thereby increasing the flow rate of fluid from said pump to said engine; and, magnetizing means surrounding said actuating member, a portion of said actuating member being responsive to magnetic forces produced when said magnetizing means is energized, and energization of said magnetizing means causing said actuating means to move said first diaphragm into pressure drawing relation with said fluid so as to draw additional fluid into said one main sub-compartment.

5. The pump of claim 4 wherein the other of said main sub-compartments is connected via an air relief valve means to atmosphere when said diaphragm is in pressure inducing relation with said fluid and is connected via said air relief valve means to the negative back pressure of said manifold when said diaphragm is in pressure drawing relation with said fluid.

6. The pump of claim 5 wherein switch means is associated with contacts in said pump for controlling energization of said magnetizing means and the position of said air relief valve means, the opening and closing of said contacts is controlled by pusher bars on said actuating means.

7. The pump of claim 6 wherein a thermal relay provides energy to said switch means when the engine has reached a predetermined temperature.

8. The pump of claim 7 further including a check valve that allows said fluid to exit said pump when said thermal relay has closed.

9. The pump of claim 6 further including pressure maintaining means that maintains a portion of said fluid under pressure while said diaphragm is in pressure drawing relation.

10. The pump of claim 1 or 4 wherein said fluid is water.

11. A water injection system for an internal combustion engine having a pump according to claim 4, said system including:
a water reservoir in fluid flow communication with said pump; and
a check valve impeding flow of water fluid from said pump to said engine when said engine is operating below a predetermined temperature.

12. The system of claim 11 further including a thermal switch which closes when the temperature of said engine rises above said predetermined temperature.

13. The system of claim 12 wherein said pump is in air flow communication with said manifold whereby negative back pressure in said manifold aids said pump means to draw water into said pump when water in said pump goes below a predetermined amount.

14. The system of claim 13 including switch means for cycling said variable pressure inducing means between pressure inducing relation and pressure drawing relation with the water fluid.

15. A water injection system for an internal combustion engine including:
a pump adapted for use in a fluid injection system of an internal combustion engine having an intake manifold, said pump controlling the rate of flow of fluid injected into said engine and comprising a variable pressure inducing means for pressurizing the fluid contained within the pump, said variable pressure inducing means including a first diaphragm dividing a main chamber of said pump into two main sub-compartments, one of said main sub-compartments containing the fluid to be pressurized, and an actuating member for moving said diaphragm into and out of pressure inducing relation with said fluid; said variable pressure inducing means being responsive to changes in negative back pressure in said manifold to vary the pressure of said fluid such that as said negative back pressure decreases the pressure of said fluid increases thereby increasing the flow rate of fluid from said pump to said engine; and
a pressure sensitive nozzle having a regulated orifice for controlling the flow of fluid from said pump into said engine, said nozzle comprising an auxiliary fluid flow path through said nozzle having an inlet opening of variable size, and pressure sensitive means normally blocking said inlet of said auxiliary flow path, said pressure sensitive means providing a primary fluid flow path through said nozzle and being movable in response to a pressure build up above a predetermined amount in said primary fluid flow path, and said pressure sensitive means moving to increase the size of said inlet of said auxiliary flow path as said pressure build up in said primary flow path increases above a predetermined amount.

16. A pump adapted for use in a fluid injection system of an internal combustion engine having an intake manifold, said pump controlling the rate of flow of fluid injected into said engine and comprising:
a variable pressure inducing means for pressurizing the fluid contained within the pump, said variable pressure inducing means including a first diaphragm dividing a main chamber of said pump into two main sub-compartments, one of said main sub-compartments containing the fluid to be pressurized, and an actuating member for moving said diaphragm into and out of pressure inducing relation with said fluid; and, said variable pressure inducing means being responsive to changes in negative back pressure in said manifold to vary the pressure of said fluid such taht as said negative back pressure decreases the pressure of said fluid increases thereby increasing the flow rate of fluid from said pump to said engine; and
magnetizing means surrounding said actuating member, a portion of said actuating member being responsive to magnetic forces produced when said magnetizing means is energized, energization of said magnetic means causing said actuating means to move said first diaphragm into pressure inducing relation with said fluid.

* * * * *